Patented July 5, 1966

3,259,592
SULFONATED POLYPHENYLENE ETHER CATION EXCHANGE RESIN
Daniel W. Fox and Popkin Shenian, Pittsfield, Mass., assignors to General Electric Company, a corporation of New York
No Drawing. Filed Nov. 29, 1961, Ser. No. 155,825
8 Claims. (Cl. 260—2.2)

This invention relates to a cation exchange resin and to a cation exchange membrane made therefrom.

Hay application Serial No. 69,245, filed November 15, 1960, now abandoned, which is assigned to the same assignee as the present application, discloses a polyphenylene ether having a repeating structural unit of the formula:

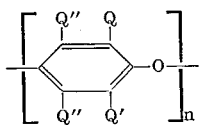

wherein the oxygen atom of one unit is connected to the benzene nucleus of the adjoining unit, $n$ is a positive integer and is at least 100, Q is a monovalent substituent selected from the group consisting of hydrogen, aliphatic hydrocarbon radicals free of a tertiary α-carbon atom, and aliphatic halohydrocarbon radicals having at least two carbon atoms and being free of a tertiary α-carbon atom, Q' and Q'' are both monovalent substituents which are the same as R and in addition halogen, arylhydrocarbon radicals, haloarylhydrocarbon radicals, hydrocarbonoxy radicals having at least two carbon atoms and being free of an aliphatic tertiary α-carbon atom, and halohydrocarbonoxy radicals having at least two carbon atoms and being free of an aliphatic tertiary α-carbon atom.

These polyphenylene ethers are produced by reacting oxygen in the presence of a tertiary amine and a cuprous salt soluble in the tertiary amine and capable of existing in the cupric state, with a phenol having the structural formula:

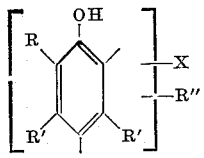

where X is a substituent selected from the group consisting of hydrogen, chlorine, bromine and iodine; R is a monovalent substituent selected from the group consisting of hydrogen, hydrocarbon radicals, and halohydrocarbon radicals having at least two carbon atoms, hydrocarbonoxy radicals and halohydrocarbonoxy radicals having at least two carbon atoms; R' and R'' are the same as R and in addition halogen. The polyphenylene ethers described above possess such interesting properties as high heat stability, high tensile strength, and excellent electrical properties. Of particular interest is the polymer derived from 2,6-dimethylphenol. Another interesting polymer is that derived from 2-methyl-6-ethylphenol. The polymer derived from o-cresol is also of interest.

One of the objects of the present invention is to provide a cation exchange resin starting with the polyphenylene ethers of the above-described Hay application.

Another object of the invention is to provide a cation exchange membrane using polyphenylene ethers as the starting material.

Another object of the invention is to provide an aryl sulfonated polyphenylene ether.

Other objects of the invention will be apparent from the following specification. Briefly stated, in accordance with one of its aspects, the invention is directed to a cation exchange resin having a repeating structural unit of the formula:

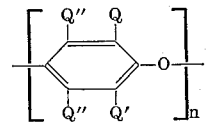

wherein the oxygen atom of one unit is connected to the benzene nucleus of the adjoining unit, $n$ is a postive integer and is at least 100, Q is a monovalent substituent selected from the group consisting of hydrogen, aliphatic hydrocarbon radicals free of a tertiary α-carbon atom, aliphatic hydrocarbon radicals having at least two carbon atoms and being free of a tertiary α-carbon atom, and —SO$_3$H; and Q' and Q'' are both monovalent substituents which are the same as Q and in addition halogen, arylhydrocarbon radicals, haloarylhydrocarbon radicals, hydrocarbonoxy radicals having at least two carbon atoms and being free of an aliphatic tertiary α-carbon atom, and halohydrocarbonoxy radicals having at least two carbon atoms and being free of an aliphatic tertiary α-carbon atom, there being at least one —SO$_3$H group present in most units.

This invention is directed in its preferred form to a cation exchange resin prepared by the aryl sulfonation of poly(2,6-dimethyl)1,4-phenylene ether. Cation exchange materials possessing useful characteristics may also be made by aryl sulfonating poly(2-methyl,6-ethyl)1,4-phenylene ether and poly(2-methyl)1,4-phenylene ether as well as other polyphenylene ethers.

Aryl sulfonation of polyphenylene ethers is effected by reacting these materials with concentrated or fuming sulfuric acid or chlorosulfonic acid. Where the acid is present in excess —SO$_3$H groups can be substituted for more than one of the ring hydrogens. It is not necessary that every ring in the polymer chain have an —SO$_3$H substituent or that all rings otherwise have the same substituents. Controlled variation of the ring substituents provides a ready means to modify properties of the final resin or membrane.

Preparation of the cation exchange materials of this invention is in accordance with the following examples which are to be considered illustrative rather than limiting.

*Example 1*

Equip a three-necked one-liter round-bottom flask with an addition funnel, mechanical agitator, and a reflux condenser which contains a drying tube. Add 25 grams of poly(2,6-dimethyl)1,4-phenylene ether into the flask along with 400 ml. of anhydrous and alcohol-free chloroform; agitate sufficiently to effect solution. Dissolve 8 grams of chlorosulfonic acid in 30 ml. of anhydrous and alcohol-free chloroform and add this dropwise to the agitated polymer solution over a period of one hour. After the addition is complete, allow the mixture to agitate for an additional eight hours and then let stand without agitation for another eight hours. During the first several hours considerable quantities of HCl will be liberated.

After the eight-hour settling period, a semiplastic material will settle from the chloroform. The chloroform is decanted and the reaction product washed carefully with water until free of the last traces of acid.

*Example 2*

To make a membrane, the reaction product from Example 1 is dissolved in 500 ml. of isopropyl alcohol. A quantity of this solution is poured onto a flat glass plate where it remains as the isopropyl alcohol solvent slowly evaporates. After evaporation of the solvent, the membrane is peeled from the glass and is ready for use as a cation exchange membrane. Membranes may also be made by extrusion in the conventional manner.

In order to demonstrate the ion exchange capacity of the membrane, a sample was leached with water overnight and then dried in an oven at 50° C. The membrane, which weighed 1.1091 grams, was placed in a bottle with 50 ml. of 0.1165 N NaOH and agitated for 24 hours. After 24 hours, the film was removed and washed with water, the washings being added to the bottle. A back titration of the caustic solution required only 26.9 ml. of 0.1272 N HCl. This indicated that 2.41 milliequivalents of base had been consumed or that the film possessed 2.17 milliequivalents of acidity in 5% HCl, and washed with water to remove excess HCl. Its acidity was redetermined as above and found to be 2.24 milliequivalents per gram.

Another membrane prepared as set forth above had an ion exchange capacity of 2.06 milliequivalents per gram on a dry basis and a resistivity of 18.1 ohms-cm. The tensile strength was 5270 p.s.i. in the dry state and the elongation to break was 70%. The same membrane after 24 hours immersion in water had a tensile strength of 1600 p.s.i. and an elongation to break of 65%. The surface resistivity of the dry film was $10^6$ ohms per square. This particular sample absorbed about 20% of its dry weight on conditioning in water.

*Example 3*

Poly-2-methyl-6-ethyl-1,4-phenylene ether (2 grams) was dissolved in 100 ml. of chloroform treated with .50 gram of chlorosulfonic acid in the manner set forth in Example 1. A film prepared as in Example 2 was found to contain 1 milliequivalent per gram of sulfonic acid and was of a toughness and flexibility equal to that of the sample described in Example 2.

*Example 4*

To demonstrate the suitability of poly-2,6-dimethyl-1,4-phenylene ether of varying molecular weight, the following example is offered:

Using the same procedure as Example 1, 20 grams of poly-2,6-dimethyl-1,4-phenylene ether ($\eta_1=0.92$, M.W.=67,000) was sulfonated with 7.2 grams of ClSO$_3$H. In this case the reaction was conducted at 0° C. and the total reaction time was limited to 2 hours, the work-up procedure was otherwise similar to that of Example 1. A film was cast from the alcoholic solution of the above product, and it was found to have an acidity of 2.2 milliequivalents per gram.

The following example demonstrates the use of a sulfonating agent other than ClSO$_3$H.

*Example 5*

In a 1-liter flask dissolve 10 parts of poly-2,6-dimethyl-1,4-phenylene ether ($\eta_1=0.4$, M.W.=25,000) in 200 parts anhydrous s-tetrachloroethane. Place a water bath around the reaction flask and maintain a temperature of 10° C. In an addition funnel adapted to the reaction flask place 6.6 parts of SO$_3$ (sulfan) and 20 parts s-tetrachloroethane. Add this sulfonating agent dropwise to the agitating polymer solution. After the addition is complete, allow the reaction mixture to agitate for 4 hours. At the end of this time, a semi-plastic material has settled out of solution. This reaction product is worked up to a membrane material in the exact same manner as Examples 1 and 2.

The preparation of a water soluble sulfonated polymer is given below:

*Example 6*

Employing the exact procedure of Example 1 except that 1 part of ClSO$_3$H was used per 1 part of polymer ($\eta_1=0.48$, M.W.=31,000), a water soluble sulfonated resin was prepared which had an acidity of 4 milliequivalents per gram.

In some cases it may be desirable to have a cross-linked polymer network for the ion exchange base. For example, in some systems only slight changes in physical dimension with solvation can be tolerated, and cross-linking can control this. Cross-linking can also change the solubility characteristics of the sulfonated resin.

A sample of sulfonated product which had an acidity of 3.0 milliequivalents per gram and which had poor wet strength was irradiated for 93 minutes with an ultraviolet lamp. After the irradiation a sample of film was tested for wet strength and found to be considerably improved in this respect as compared to the untreated film. This suggests that the polymer has been cross-linked via the treatment.

Additional wet strength can be imparted by longer or more intense ultraviolet dosages or electron irradiation.

*Example 7*

Poly-2-methyl-1,4-phenylene ether (2 grams) dissolved in 100 ml. chloroform was reacted with 0.75 gram of chlorosulfonic acid as set forth in Example 1 and the end product was formed into a film in the manner set forth in Example 2. The membrane contained 1.4 milliequivalents per gram of sulfonic acid. It was somewhat less tough and flexible than the films of Examples 2 and 3 but nevertheless was strong enough for most applications.

The sulfonated polyphenylene ethers of the present invention form cation exchange membranes which may be used for deionizing brackish water, as fuel cell elements, battery separators, and semiconductor applications.

In some instances it is desirable to modify some of the physical characteristics of the membranes by preparing interpolymers. This is very simply accomplished by casting the aryl sulfonated polyphenylene ethers of this invention along with some other polymer from a common solvent. Interpolymers may also be prepared by co-casting highly and lowly sulfonated species of the polymers of this invention.

There are a number of examples for use of cationic exchange resins in which water solubility is undesirable—electrodialysis membranes, fuel cell membranes, etc. There are also a considerable number of uses in which a water soluble resin is desirable—sizing agents (textile assistants), protective colloids, adhesives, thickening agents, dispersing agents, wetting agents, detergents, penetrants, foaming agents, etc.

Sulfonated phenolic and cross-linked polystyrene resins have been known and used as cation exchange resins for many years. These materials are deficient in that they are generally quite brittle and difficult to fabricate in any form other than beads or mechanically disintegrated particles such as would result from grinding a mass of brittle, insoluble resin. This physical state of materials is adequate for general purpose use in column type, packed bed deionizers, or for oral ingestion for therapeutic purposes. It is not satisfactory for use in membrane-type fuel cells and electrodialysis based water purification.

Ion exchange membranes have been prepared by casting polymerized resins into sheets with or without a supporting and re-enforcing web of nonreactive material such as glass or synthetic resin fiber mats, the whole assembly being cured in an enclosed mold which prevents loss of water from the system. Such membranes are rather brittle and must be handled with extreme care—particularly if the mositure content is inadvertently lowered. The change in dimensions which results from cycling from low to high humidity or from immersion in water to air drying is frequently sufficient to cause cracking and consequent loss of functionality.

The sulphonated polyphenylene ethers of the present invention yield an ion exchange resin which is not only linear and soluble in a variety of solvents but one which can be readily fabricated into tough, flexible, high-strength, high-capacity, low resistivity ion exchange film or membranes. Repeated water immersion with attendant swelling and air drying with attendant shrinkage does not appear to have any deleterious effect. Prolonged boiling in water has no detectable effect on ion exchange capacity or solubility. A membrane which has been swollen in water, shrunk by drying, and then boiled in water retains its excellent physical properties and ion-exchange capacity. It may at any time be redissolved in an alcoholic solvent and recast into film of the same thickness or any desired thickness.

Solvent casting of film in a wide variety of thicknesses is possible using conventional industrial techniques. There are no limitations on the film gauge, films as thin as .0005" have been made. The film is transparent and pale amber to colorless. Fibrous ion exchange resin has been made by directing small streams of resin solution into a coagulating bath of water.

It is possible to vary the ion-exchange capacity over a wide range by varying the degree of sulfonation. For example, films have been produced with a capacity of 0.5 to 2.5 milliequivalents per gram (dry basis) which still retain good physical properties although there is a tendency for some solution in water at the higher end of the range if the base resin has an osmotic molecular weight of about 25,000 or less. If a higher capacity is desired, the polyphenylene ether used should have an osmotic molecular weight of greater than 25,000, preferably 50,000 or more. By this procedure, it is possible to increase the exchange capacity and maintain or reduce the water solubility while at the same time increasing the extent of sulfonation.

Dry heating of the resin at temperatures in excess of 100° C. for periods of 16 hours or more causes a slight decrease in exchange capacity but the resin loses its linear solubility characteristics to some extent. While the reason for this has not been determined conclusively, it is believed that it is due to cross-linking of the linear polymer through the formation of sulfone linkages. This unexpected and unpredictable behavior makes it possible to cast a soluble resin in any thickness desired and subsequently partially cure it if enhanced resistance to water or solvents is desired. Losses in physical properties resulting from cross-linking are negligible at low and useful degrees of cure.

Polyphenylene ether films are subject to stress crazing in the presence of selected solvents such as acetone or hexane. When such polyphenylene ethers are sulfonated in accordance with this invention and cast into a similar film form, the product is no longer susceptible to such stress cracking or crazing. Thus, a tough, flexible film can be made which is relatively free of stress-cracking and crazing tendencies and which has as another advantage the possibility of modifying the insulation resistance. Such a material can be used either as a lacquer, a fabricated soluble film, or as a cured film for selected insulation properties. For example, such film or coatings can be used for anti-static purposes on synthetic fibers and insulating-type plastic objects as shown by the following example:

Example 8

A thin film of sulfonated poly-2,6-dimethyl-1,4-phenylene oxide was coated onto a polystyrene tensile bar by dipping the bar into a 1% alcoholic solution of the sulfonated resin, followed by drying. The surface of the coated styrene was found to have a resistivity of $5 \times 10^5$ ohms per square as compared to $2 \times 10^{12}$ ohms per square for the uncoated polystyrene. Samples of the coated and uncoated polystyrene were charged with static electricity (corona discharge) and it was found that the surface resistivity of the coated polystyrene was sufficiently low that all the charge had leaked off in less than 30 seconds, while the surface resistivity of the uncoated polystyrene is high enough to retain a charge up to 6 volts after 5 minutes.

The example was repeated using polyvinyl chloride in place of the polystyrene. The antistatic behavior of the sulfonated polymer coating was again observed.

Films containing finely dispersed metals usable as printed circuits are prepared according to the following example:

Example 9

A film of sulfonated poly-2,6-dimethyl-1,4-phenylene oxide (acidity of 2.5 milliequivalents per gram) was immersed in a 2% solution of silver nitrate and agitated for one hour. The film was next thoroughly rinsed in water. The silver salt of the sulfonated resin was reduced to metallic silver by treatment in a basic solution of hydroquinone. The silver deposit on the film was quite uniform and was reflective to light. This film which contained finely dispersed metal retained the excellent physical strength of the free-acid film and had an electrical resistivity of $3.5 \times 10^{-4}$ ohms —cm. vs. $1.6 \times 10^{-6}$ for metallic silver at the same temperature. The electrical resistivity can be either lowered or increased by exercising control on the number of sulfonic acid groups in the resin.

A silver coating was deposited on a styrene tensile bar by first applying a thin coating of the sulfonated resin followed by the above process. This demonstrates the ability to prepare a coating of finely dispersed metal on plastics via this procedure.

Films with finely dispersed mercury and copper were prepared in a manner similar to the above procedure.

Photographic film is prepared from the film of this invention as follows:

Example 10

A sample of aryl sulfonated polyphenylene ether film having an acidity of 2.5 milliequivalents per gram was immersed for 10 minutes in a 2% solution of silver nitrate and then washed thoroughly with water. The $Ag^+$ salt of the sulfonated resin was then treated with a 5% solution of KBr for 15 minutes in a dark box, after which it was washed well with water and dried for 4 hours (all in a dark box). The film which at this point has AgBr uniformly precipitated throughout was placed in between a dark plate and a metal grating. This assembly was then exposed to light for one minute. The film was removed from the assembly (in a dark box) and placed in a hydroquinone bath for 30 minutes. After washing the film with water, it was placed in a potassium thiosulfate bath for several minutes. The film at this point was removed and found to possess a replica pattern of the grating.

Surface resistivity has been determined on the dry film to be of the order of $10^5$ to $10^6$ ohms per square. This property is useful in a number of applications. In xerographic processes it is well known that in low humidity atmospheres paper becomes too poor a conductor to allow surface charge to be dissipated from the photoconductive surface. If the material described herein is used as a binding agent or surface treatment for such paper base, a permanent ground plane would be available independent of humidity, as shown in the following example:

Example 11

A signal of 90 v. was applied to a xerographic paper which had been kept at 20% R.H. A grid pattern was projected and the electrostatic image developed with toner. Poor separation between blacks and whites resulted due to the inability of the paper to discharge the illuminated areas. The same paper pretreated with aryl sulfonated poly-2,6-dimethyl-1,4-phenylene oxide produced a good black and white image.

In other electric processes where it is desirable to obtain a clear, easily applied, semi-conducting coating on a substrate, or even a flexible, transparent, semiconducting base material, the aryl sulfonated polyphenylene ethers of this invention are effective applied as a lacquer to a substrate or as an unsupported film. Processes within the scope mentioned above are: electrophotography, anti-static layers on television screens, photo cells, solar batteries, and electric deicing coatings for windshields.

*Example 12*

A membrane 6 inches square and 0.004 inch thick and consisting of aryl sulfonated poly(2,6-dimethyl)1,4-phenylene ether, was made by casting as in Example 2. This membrane had a cation exchange capacity of 2.5 milliequivalents per gram. Finely divided platinum powder was pressed into both sides of the membrane to form a thin continuous film. The membrane-platinum assembly was positioned between grooved plates of Carpenter 20 stainless steel and this assembly was positioned in an insulating frame. The platinum films were dampened with water and hydrogen was introduced to one of the platinum films while oxygen was introduced to the other. A load was connected across the stainless steel plates. Measurement of the current and voltage across the plates revealed that the cell was generating 50 amperes per square foot at 0.75 volt.

While the invention has been described with reference to certain specific embodiments, it is obvious that there are many variations which fall within the true spirit of the invention. Accordingly, the invention should be limited in scope only as may be necessitated by the scope of the appended claims.

What we claim as new and desire to secure by Letters Patent of the United States is:

1. A cation exchange resin having a repeating structural unit of the formula:

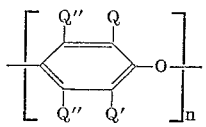

wherein the oxygen atom of one unit is connected to the benzene nucleus of the adjoining unit, $n$ is a positive integer and is at least 100, Q is a monovalent substituent selected from the group consisting of hydrogen, aliphatic hydrocarbon radicals free of a tertiary α-carbon atom, aliphatic halohydrocarbon radicals having at least two carbon atoms and being free of a tertiary α-carbon atom; Q' is a monovalent substituent which is the same as Q and in addition halogen, arylhydrocarbon radicals, haloarylhydrocarbon radicals, hydrocarbonoxy radicals having at least two carbon atoms and being free of an aliphatic tertiary α-carbon atom, and halohydrocarbonoxy radicals having at least two carbon atoms and being free of an alphatic tertiary α-carbon atom, and Q" is the same as Q' and in addition —SO₃H, there being at least one —SO₃H group in a substantial portion of the units.

2. A cation exchange resin as claimed in claim 1 wherein Q and Q' are aliphatic hydrocarbon radicals free of tertiary α-carbon atoms and at least one Q" is —SO₃H.

3. A cation exchange resin as claimed in claim 1 wherein Q and Q' are methyl, one Q" is —SO₃H and the other is selected from the group consisting of —SO₃H and hydrogen.

4. A film of cation material having a repeating unit of the formula:

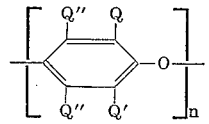

wherein the oxygen atom of one unit is connected to the benzene nucleus of the adjoining unit, $n$ is a positive integer and is at least 100, Q is a monovalent substituent selected from the group consisting of hydrogen, aliphatic hydrocarbon radicals free of a tertiary α-carbon atom, aliphatic halohydrocarbon radicals having at least two carbon atoms and being free of a tertiary α-carbon atom; Q' is a monovalent substituent which is the same as Q and in addition halogen, arylhydrocarbon radicals, haloarylhydrocarbon radicals, hydrocarbonoxy radicals having at least two carbon atoms and being free of an aliphatic tertiary α-carbon atom, and halohydrocarbonoxy radicals having at least two carbon atoms and being free of an aliphatic tertiary α-carbon atom; and Q" is the same as Q' and in addition —SO₃H, there being at least one —SO₃H group in a substantial portion of the units.

5. A cation exchange resin in sheet form as claimed in claim 4 wherein Q and Q' are aliphatic hydrocarbon radicals free of tertiary α-carbon atoms and at least one Q" is —SO₃H.

6. A cation exchange resin in sheet form as claimed in claim 4 wherein Q and Q' are methyl, one Q" is —SO₃H and the other is selected from the group consisting of —SO₃H and hydrogen.

7. An anti-static material comprising a substrate of high electrical resistivity, and a thin film of aryl sulfonated polyphenylene oxide on said substrate.

8. An anti-static material as claimed in claim 7 wherein the film is aryl sulfonated poly-2,6 dimethyl-1,4-phenylene oxide.

References Cited by the Examiner

UNITED STATES PATENTS

| | | | |
|---|---|---|---|
| 2,891,014 | 6/1959 | Tsunoda et al. | 260—2.2 |
| 3,113,867 | 12/1963 | Van Norman | 96—87 |
| 3,137,576 | 6/1964 | Himmelmann | 260—47 |

OTHER REFERENCES

Haynes et al.: Chemical Society Journal, pages 2823–31 (1956).

WILLIAM H. SHORT, *Primary Examiner.*

LOUIS P. QUAST, *Examiner.*

J. T. BROWN, J. C. MARTIN, *Assistant Examiners.*